(12) United States Patent
Yung et al.

(10) Patent No.: US 11,117,262 B2
(45) Date of Patent: Sep. 14, 2021

(54) INTELLIGENT ROBOTS

(71) Applicant: eBots Inc., Fremont, CA (US)

(72) Inventors: Kai C. Yung, Livermore, CA (US); Zheng Xu, Pleasanton, CA (US); Jianming Fu, Palo Alto, CA (US)

(73) Assignee: EBOTS INC., Fremont, CA (US)

(*) Notice: Subject to any disclaimer, the term of this patent is extended or adjusted under 35 U.S.C. 154(b) by 336 days.

(21) Appl. No.: 16/051,251

(22) Filed: Jul. 31, 2018

(65) Prior Publication Data

US 2019/0184570 A1 Jun. 20, 2019

Related U.S. Application Data

(60) Provisional application No. 62/539,926, filed on Aug. 1, 2017.

(51) Int. Cl.
| | |
|---|---|
| *B25J 9/16* | (2006.01) |
| *B25J 19/02* | (2006.01) |
| *G01B 11/25* | (2006.01) |
| *B25J 13/00* | (2006.01) |
| *B25J 13/08* | (2006.01) |
| *B25J 17/02* | (2006.01) |

(52) U.S. Cl.
CPC ............ *B25J 9/1697* (2013.01); *B25J 9/16* (2013.01); *B25J 9/161* (2013.01); *B25J 9/163* (2013.01); *B25J 13/006* (2013.01); *B25J 13/086* (2013.01); *B25J 17/0283* (2013.01); *B25J 19/023* (2013.01); *G01B 11/2513* (2013.01)

(58) Field of Classification Search
None
See application file for complete search history.

(56) References Cited

U.S. PATENT DOCUMENTS

| | | | |
|---|---|---|---|
| 5,987,591 A | 11/1999 | Jyumonji | |
| 8,437,535 B2 * | 5/2013 | Boca | G01B 11/25 |
| | | | 382/154 |
| 2004/0067127 A1 * | 4/2004 | Hofmeister | H01L 21/681 |
| | | | 414/744.5 |

(Continued)

FOREIGN PATENT DOCUMENTS

| | | | | |
|---|---|---|---|---|
| EP | 2543482 A1 | 9/2013 | | |
| EP | 3284563 A2 * | 2/2018 | ............ | B25J 9/1697 |
| WO | WO-2018053430 A1 * | 3/2018 | ............ | G16Z 99/00 |

OTHER PUBLICATIONS

Hijazi, Samer, Kumar, Rishi, Rowen, Chris, "Using Convolutional Neural Networks for Image Recognition", 2015, Cadence (Year: 2015).*

*Primary Examiner* — Khoi H Tran
*Assistant Examiner* — Tristan J Greiner
(74) *Attorney, Agent, or Firm* — Shun Yao; Park, Vaughan, Fleming & Dowler LLP.

(57) ABSTRACT

One embodiment can provide an intelligent robotic system. The intelligent robotic system can include at least one multi-axis robotic arm, at least one gripper attached to the multi-axis robotic arm for picking up a component, a machine vision system comprising at least a three-dimensional (3D) surfacing-imaging module for detecting 3D pose information associated with the component, and a control module configured to control movements of the multi-axis robotic arm and the gripper based on the detected 3D pose of the component.

17 Claims, 12 Drawing Sheets

(56) References Cited

U.S. PATENT DOCUMENTS

| | | | |
|---|---|---|---|
| 2014/0365009 A1* | 12/2014 | Wettels | B25J 15/0028 |
| | | | 700/258 |
| 2015/0019013 A1* | 1/2015 | Rose | B25J 15/10 |
| | | | 700/258 |
| 2015/0224648 A1* | 8/2015 | Lee | G06K 9/00214 |
| | | | 700/259 |
| 2017/0028562 A1 | 2/2017 | Yamazaki et al. | |
| 2017/0057092 A1 | 3/2017 | Ito | |
| 2017/0151672 A1 | 6/2017 | Ando | |
| 2019/0291277 A1* | 9/2019 | Oleynik | B25J 9/1669 |

* cited by examiner

INTELLIGENT ROBOTS

RELATED APPLICATION

This claims the benefit of U.S. Provisional Patent Application No. 62/539,926, entitled "INTELLIGENT ROBOTS," filed Aug. 1, 2017, the disclosure of which is incorporated herein by reference in its entirety for all purposes.

BACKGROUND

Field

This disclosure is generally related to robots. More specifically, this disclosure is related to artificial intelligence (AI)-enabled high-precision robots with that can be used for manufacturing in electronics industry.

Related Art

Automation (e.g., the use of robots) has been widely used and is transforming manufacturing in the automotive and industrial equipment industries. More specifically, the robot density has reached 1,414 (per 10,000 workers) in the automotive industry in Japan and 1,141 in the United States. However, the rapidly growing electrical/electronics industries have been lagging in the implementation of robots in their production lines. The robot density in the electronics industry is merely 318 in United States and just 20 in China. More specifically, when producing consumer electronics (e.g., smartphones, digital cameras, tablet or laptop computers, etc.), the assembly work is still largely performed by human workers. This is because there are many challenges in adopting robotics in the manufacturing of consumer electronics. The primary challenges can include short product life cycles, rapid change of products, low direct labor costs, poor dexterity of the robots, complexity of implementation and maintenance of the robots, and the lack of robot reusability.

Various low-cost collaborative robots have been developed to address the cost and reusability issues, and various intelligent systems have been attempted to make industrial robots smarter. For example, multiple sensors can be added to a robotic system to allow the robot to recognize work pieces, detect the presence of foreign objects to avoid, and detect collision. Moreover, some existing industrial robots can communicate with humans using voice and dialogue, and can be taught kinematic movements by demonstration. However, current robots are still far away from matching the capability of humans in terms of flexibility to execute various tasks and learn new skills.

SUMMARY

One embodiment can provide an intelligent robotic system. The intelligent robotic system can include at least one multi-axis robotic arm, at least one gripper attached to the multi-axis robotic arm for picking up a component, a machine vision system comprising at least a three-dimensional (3D) surface-imaging module for obtaining 3D pose information associated with the component, and a control module configured to control movements of the multi-axis robotic arm and the gripper based on the detected 3D pose of the component.

In a variation on this embodiment, the 3D surface-imaging module can include a camera and a structured-light projector.

In a further variation, the structured-light projector can include a digital light processing (DLP) chip, a mirror array, or an independently addressable VCSEL (vertical-cavity surface-emitting laser) array.

In a further variation, the 3D surface-imaging module can be configured to perform one of more of: generating a low-resolution 3D point cloud using a spatial-codification technique and generating a high-resolution 3D point cloud using a spatial and time-multiplexing technique.

In a variation on this embodiment, the machine vision system can be configured to apply a machine-learning technique while detecting the 3D pose information of the component.

In a further variation, applying the machine-learning technique comprises training one or more convolutional neural networks (CNNs).

In a further variation, training the CNNs can include using a plurality of images of the component generated based on a computer-aided design (CAD) model of the component as training samples.

In a further variation, the CNNs can include a component-classifying CNN and a pose-classifying CNN.

In a variation on this embodiment, the machine vision system can further include an ultrasonic range finder configured to estimate a distance between the gripper and the component.

In a variation on this embodiment, the multi-axis robotic arm has at least six degrees of freedom.

In a variation on this embodiment, the intelligent robotic system can further include at least one two-dimensional (2D) imaging module configured to obtain wide-field visual information associated with the component.

BRIEF DESCRIPTION OF THE FIGURES

In the figures, like reference numerals refer to the same figure elements.

DETAILED DESCRIPTION

Figure 1:
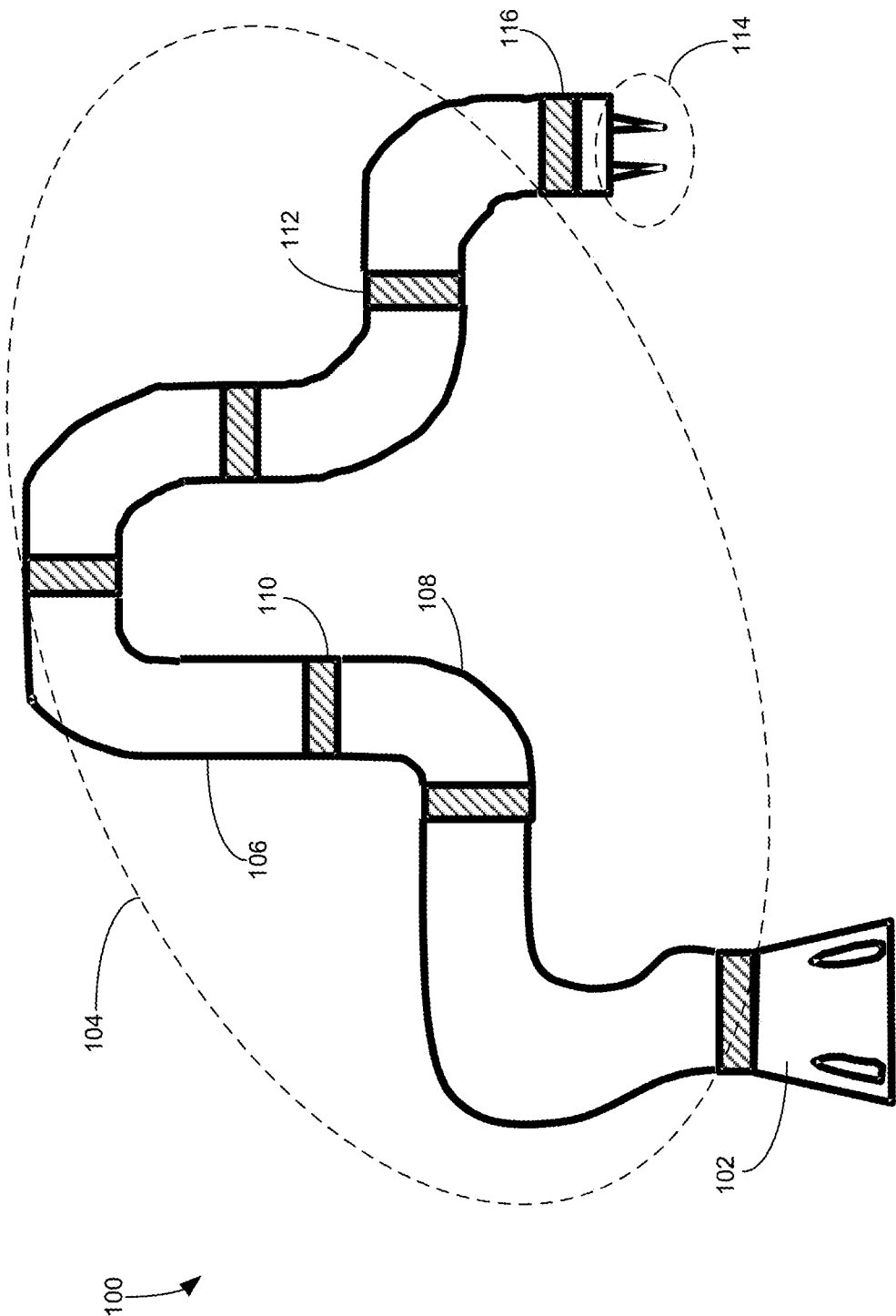
FIG. 1 shows the mechanical body of an exemplary intelligent robot, according to one embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments described herein solve the technical problem of providing highly intelligent robots capable of performing light-load but complex operations (e.g., connecting cables) typically required for assembling consumer electronics. The robot can include one or more multi-axis arms equipped with grippers for picking up rigid or flexible components. The robot can also include a guiding system that implements novel three-dimensional (3D) machine visioning technologies; and an artificial intelligence (AI)-enabled human-machine interface (HMI) capable of transfer and expert guided reinforcement learning. Transfer learning is using a pre-trained neural network to accelerate learning by taking advantages of previously taught heuristics. Expert guided reinforcement learning is using experts (e.g., human) to initially teach robots how to achieve a stated goal, and then have the robot experiment in the vicinity of this solution space to find improved solutions. In some embodiments, the 3D machine visioning can be accomplished via the implementation of a structured-light source and can be trained using images generated based on computer-aided design (CAD) models. After accurately recognizing a work piece and its location and pose using the guiding system, the robot can perform motion planning and move its arm toward the recognized work piece at an optimal angle. In some embodiment, the robot can also include a tactile feedback module that includes multiple 3-axis force sensors. The tactile feedback module can enable touch sensing in order to provide feedback to the gripper's position and force. While the robot's arm is approaching the work piece, the guiding system (via vision and tactile feedbacks) continues to acquire images to fine tune the movements of the arm's grip approach.

Intelligent Robots: The Mechanics

As discussed previously, there are challenges for implementing robots in the manufacturing assembly lines of electronics, particularly consumer electronics. One challenge is the poor dexterity of existing robots. Assembling consumer electronics often involves handling many small (e.g., in the range of millimeters or less) components in a confined space, and currently available robots often lack the ability to perform such a task. A robot that can mimic, to a certain degree, human arm and hand movements is needed to meet the requirements of manufacturing consumer electronics.

FIG. 1 shows the mechanical body of an exemplary intelligent robot, according to one embodiment. Intelligent robot 100 comprises a base 102 and a multi-joint arm 104 supported by base 102. In some embodiments, base 102 can be placed on a translation stage (not shown in FIG. 1) to allow base 102 to move in a horizontal plane. Multi-joint arm 104 can include multiple sections, with adjacent sections coupled to each other via a rotational joint. For example, arm sections 106 and 108 are coupled to each other via rotational joint 110. In some embodiments, each rotational joint can include a servo motor capable of continuous rotation within a particular plane. As one can see from FIG. 1, some of the rotational joints can rotate in the horizontal plane (e.g., rotational joint 110) and some of the rotational joints can rotate in the vertical plane (e.g., rotational joint 112). The combination of the multiple rotational joints can enable multi-joint arm 104 to have an extensive range of movement and have six degrees of freedom (6DoF). Moreover, if base 102 is on a translation stage, intelligent robot 100 can have seven degrees of freedom. To facilitate movement control of multi-joint arm 104, multi-joint arm 104 can also include various other components, such as transmissions (e.g., harmonic drives), encoders, torque sensors, etc., that can facilitate its motions.

Intelligent robot 100 can also include one or more grippers (e.g., gripper 114) attached to a wrist joint 116 of multi-joint arm 104. Gripper 114 can be used to pick up and maneuver components (e.g., electronic components) during operation. In some embodiments, gripper 114 can be a mechanical gripper. In alternative embodiments, gripper 114 can be a vacuum gripper. Depending on the needs of the assembly line, the mechanical clipper can be a parallel gripper (as shown in FIG. 1), a multi-point (e.g., three- or four-point) gripper, an angled gripper, a radial gripper, a bellows gripper, etc. In addition to different shapes, gripper 114 may also be made of different materials depending on the manufacturing need. For tasks that involve handling durable components, gripper 114 can be made of metallic materials, whereas for tasks that involve handling fragile components, gripper 114 can be made of rubber. In the example shown in FIG. 1, only one gripper is shown. In practice, multiple grippers can be attached to the wrist joint to allow interactions of multiple target components. When multiple grippers are present, the control of intelligent robot 100 can determine which or which type of gripper to use based the classification of the component and its 3D path.

In order to pick up and maneuver components in a precise manner, a guiding system is needed to guide the movements of the multi-joint arm and the gripper. Machine-vision-based guiding systems have been used to guide the operation of robots. Current machine-vision systems typically rely on two-dimensional (2D) images for feature recognition and for locating components. 2D machine visioning cannot provide accurate position and orientation information of a component if the component is not lying flat on a work surface. Assembling consumer electronics often requires a robot to handle a flexible component that cannot lie flat, such as connector with cables. To accurately locate a flexible component when it is suspended in midair, depth information is needed. In some embodiments, the intelligent robot can include a 3D machine-vision system that can not only identify a component but also acquire its 3D pose, including its position and orientation. In addition to locating and acquiring the pose of a component, the 3D machine-vision system can also be used for assembling the component.

In the assembly line of a consumer electronics product (e.g., a smartphone), various components may be randomly placed on a work surface. The machine-vision system needs to first find a desired component and then accurately acquire the pose of that component. These two operations require very different resolutions of the vision system. To accelerate the operation of the guiding system, in some embodiments, the guiding system can include multiple cameras. For example, the guiding system can include at least a wide-field-of-view camera and another close-range camera. The wide-field-of-view camera can be installed on the body of the robot, whereas the close-range camera can be installed at a location closer to the gripper. In some embodiments, the wide-field-of-view camera can be installed at a location close to the base of the intelligent robot, as shown in FIG. 2.

Figure 2:
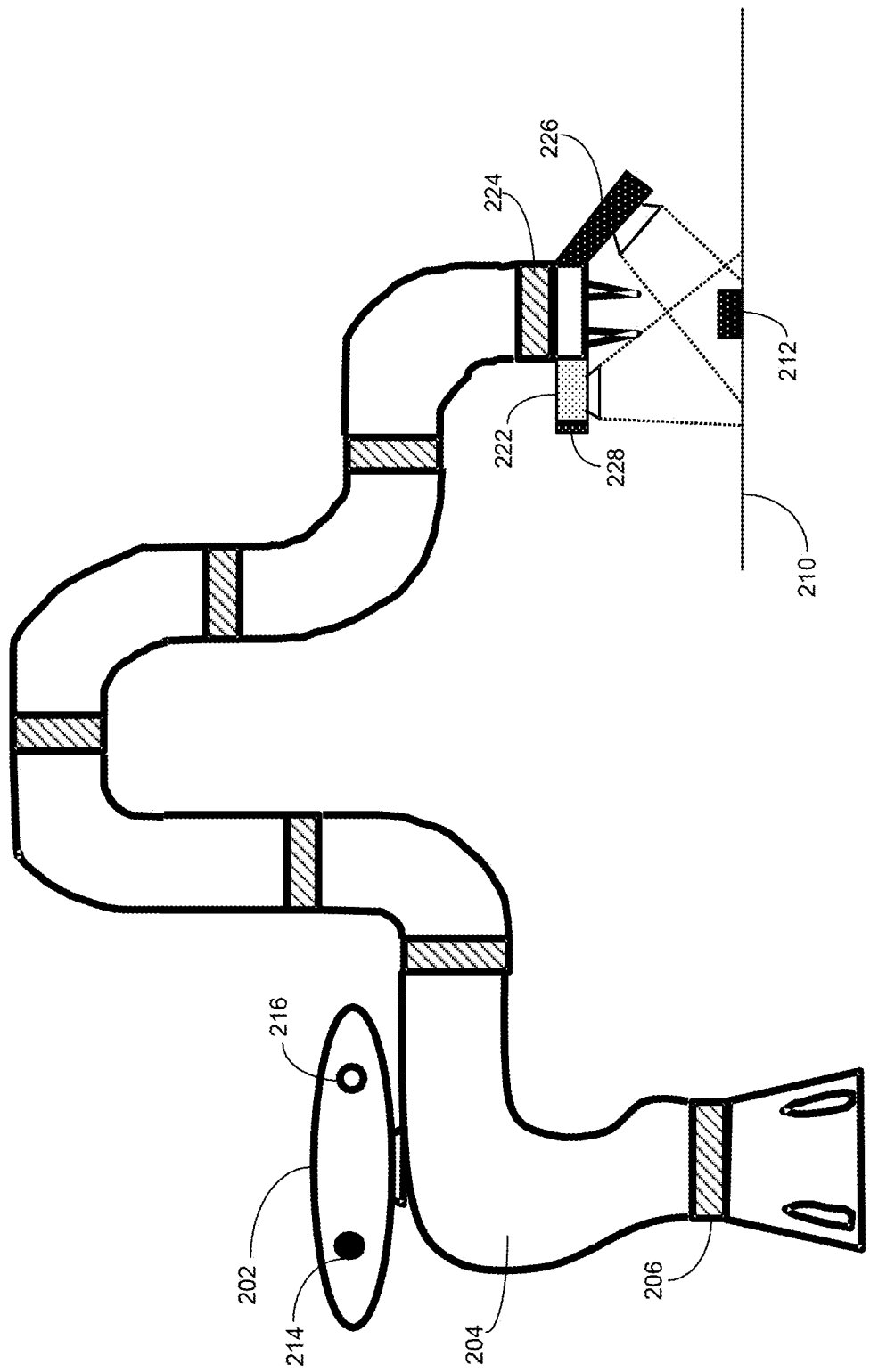
FIG. 2 shows the mechanical body along with a guiding system of an exemplary intelligent robot, according to one embodiment.

FIG. 2 shows the mechanical body along with a guiding system of an exemplary intelligent robot, according to one embodiment. In FIG. 2, wide-field-of-view camera system 202 can be attached to a lower portion of the robot arm (i.e., arm section 204), close to the base of the robot, overseeing work surface 210. Because arm section 204 is coupled to the base of the robot via a rotational joint 206, as arm section 204 rotates, wide-field-of-view camera system 206 can scan a large range of work surface 210 to search for component 212. In some embodiments, to obtain depth information, wide-field-of-view camera system 202 can include, in addition to camera 214, a structured-light projector 216. Note that the term "structured light" refers to active illumination of a scene with specially designed 2D spatially varying intensity patterns. An image sensor (e.g., a camera) acquires 2D images of the scene under the structured-light illumination. If the scene is a planar surface without any 3D surface variation, the pattern shown in the acquired image is similar to that of the projected structured-light pattern. However, when the surface in the scene is non-planar, the geometric shape of the surface distorts the projected structured-light pattern as seen from the camera. The principle of structured-light 3D surface imaging techniques is to extract the 3D surface shape based on the information from the distortion of the projected structured-light pattern. Accurate 3D surface profiles of objects in the scene can be computed by using various structured-light principles and algorithms. In other words, the combination of camera 214 and structured-light projector 216 can provide not only surface images but also depth information of work surface 210.

Once wide-field-of-view camera system 202 found component 212, or the area where component 212 resides on work surface 210, the guiding system can guide the movement of the robot arm to bring its gripper close to component 212. In some embodiments, wide-field-of-view camera system 202 may also acquire the pose (including position and orientation) of component 212 in order to allow for more accurate motion planning. Not only is the gripper moved closer to component 212, it can also be configured to approach component 212 at an optimal angle.

Close-range camera 222 can be attached to the stem or base of the gripper, which is attached to wrist joint 224 of the robot arm. Hence, close-range camera 222 can be closer than wide-field-of-view camper system 202 to component 212 during the operation of the robot and can provide feedback to the robot control system. To provide depth information, a structured-light projector 226 can also be installed in the vicinity of close-range camera 222 (e.g., attached to the same base of the gripper). Moreover, an ultrasonic sensor 228 can also be included. More specifically, ultrasonic sensor 228 can be used as a range finder to measure the rough distance to component 212. Note that, in order to achieve the accuracy of a few microns, close-range camera 222 and structured-light projector 226 need to be placed very close to the object (e.g., within 150 mm) due to the limitations of pixel size in the image sensor and the limitations of pixel size in the light projector. On the other hand, an ultrasonic range finder has the advantage of a longer sensing range and a fast response, and can be suitable for detecting the distance to a moving object. The ultrasonic wave emitted by ultrasonic sensor 228 can be amplitude modulated or frequency modulated.

In some embodiments, the robot can turn on structured-light projector 226 in response to ultrasonic sensor 228 detecting that the distance to component 212 is less than a predetermined value (e.g., 150 mm). More specifically, structured-light projector 226 can project multiple patterns on the small area of work surface 210 that includes component 212, and close-range camera 222 can then capture a sequence of images synchronously with the projecting of patterns. The close range can provide high resolution images as well as a high-accuracy computation of depth information. In some embodiments, a 3D point cloud can be generated, which includes 3D data of objects within the field of view of close-range camera 222. The 3D data can be used to guide the movement of the robot. For example, the 3D data can be used to infer the exact 3D pose of component 212, thus enabling the gripper to accurately pick up component 212.

In some embodiments, each gripper can also include one or more multi-axis force sensors that can be used to provide touch feedback. The touch feedback can facilitate path adjustment of the robotic arm and the gripper while the gripper is approaching or in contact with the component of interest.

Figure 3:
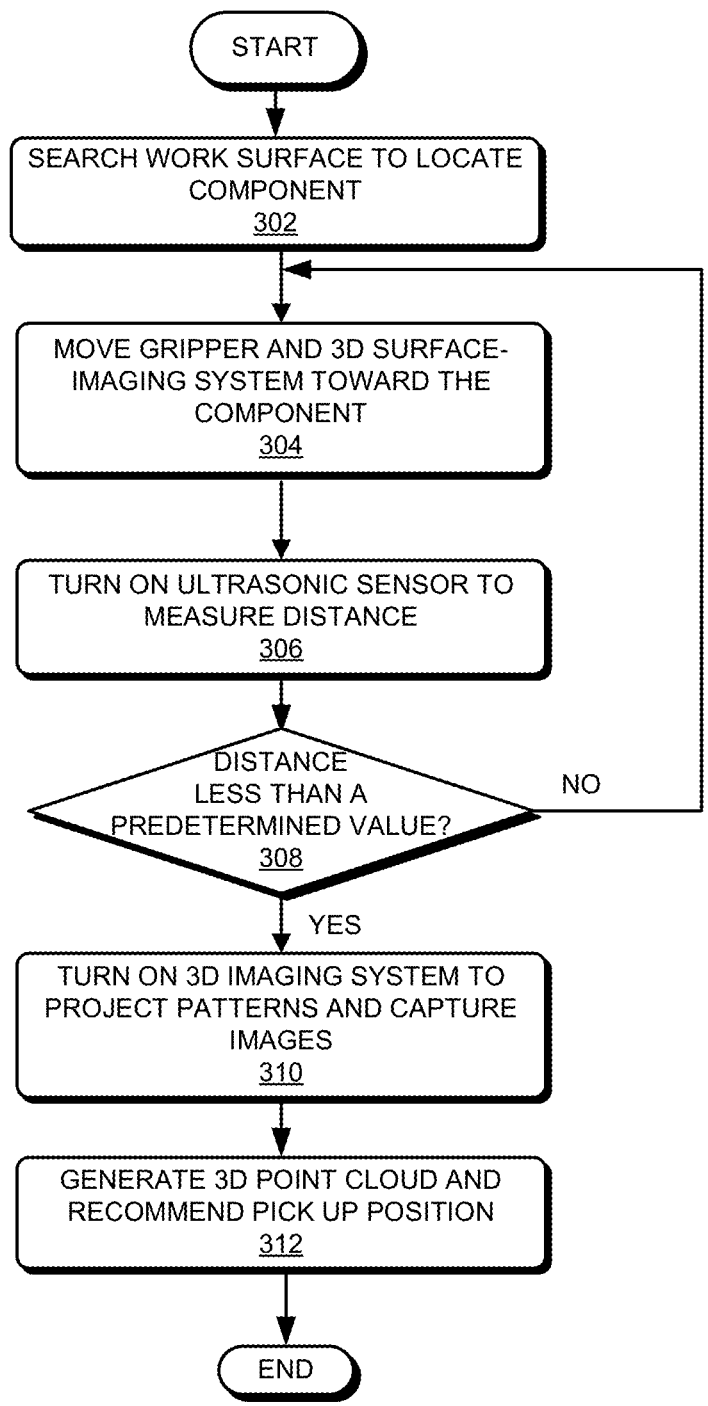
FIG. 3 shows a flowchart illustrating the operation of an exemplary robot, according to one embodiment.

FIG. 3 shows a flowchart illustrating the operation of an exemplary robot, according to one embodiment. During operation, the robot first searches the work surface to locate a particular component (operation 302). In some embodiments, such a search can involve a wide-field-of-view camera, which scans the work surface and takes images from a distance. In some embodiments, a pre-trained neural network can be used to identify the desired component. The training of the neural network will be explained later. Subsequent to locating the desired component on the work surface, the robot can move its gripper along with a 3D surface-imaging system, which can include a close-range camera and a structured-light projector, toward the vicinity of the component (operation 304). The robot can further turn on an ultrasonic sensor, which is installed close to the 3D surface-imaging system, and uses the ultrasonic sensor to measure a rough distance to the area where the desired component resides (operation 306). The robot then determines whether the distance is less than a predetermined value (e.g., 150 mm) (operation 308). If not, the robot continues to move the gripper (operation 304). If so, the robot turns on the 3D surface-imaging system (operation 310). More specifically, the 3D surface-imaging system can use a time-multiplexing technique to acquire the 3D pose of the desired object. The spatial and time-multiplexed 3D surface imaging involves projecting a series of light patterns so that every encoded point is identified with the sequence of intensities it receives. The spatial and time-multiplexed 3D surface imaging also involves the camera capturing images synchronously with the projected patterns. More specifically, an image is captured for each projected pattern.

The advantages of this time-multiplexing imaging technique can include high resolution, high accuracy, and robustness against noise. The drawbacks include the large number of patterns and a higher computing cost. Based on the captured images and the projected patterns, the robot can generate a 3D point cloud describing the area surrounding the component and recommend a pick up position for the gripper (operation 312).

In some embodiments, the ultrasonic sensor can be omitted. Instead, the system can use a 2D wide-field imaging system to first find the component of interest and then move the gripper along with a 3D surface-imaging system closer to the component of interest. The 3D surface-imaging system can combine both spatial codification and time multiplexing when acquiring the 3D pose of a desired component. In the spatial codification paradigm, a field of dots is projected onto the scene and a set of dots is encoded with the information contained in a neighborhood (called a window) around them. In spatial codification, only one image is taken. Consequently, it can provide a fast response, and can be suitable for moving objects. Spatial codification also has the advantage of being able to use video stream as input as well as being able to have a far field-of-view. The drawback of spatial codification is its lower accuracy. Hence, spatial codification is more applicable to far field and rapidly moving objects, and can be used for rough estimation of the 3D pose of a component. On the other hand, as discussed previously, the spatial and time-multiplexed 3D surface imaging can provide the higher accuracy and is more applicable to near field-of-view prior to the gripper picking up the component. In some embodiments, the spatial codification can be performed using a far-field-of-view camera and a corresponding structured-light projector, and the spatial and time-multiplexed 3D surface-imaging can be performed using a near-field-of-view camera and a corresponding structured-light projector. In alternative embodiments, the 3D surface-imaging system can use the same camera/structured-light projector pair to perform both the spatial codification and the spatial and time-multiplexed 3D surface imaging, as long as the focal range of the camera is large enough and the structured-light projector can have sufficient resolution.

In practice, the 3D surface-imaging system can first employ spatial codification to obtain a far-field 3D description of the work surface, which can be used for component searching, identification, and tracking. Subsequent to moving the gripper closer to the component, the 3D surface-imaging system can switch to time-multiplexing in order to obtain the accurate 3D pose of the component to guide the gripper to pick up the component.

Figure 4A:
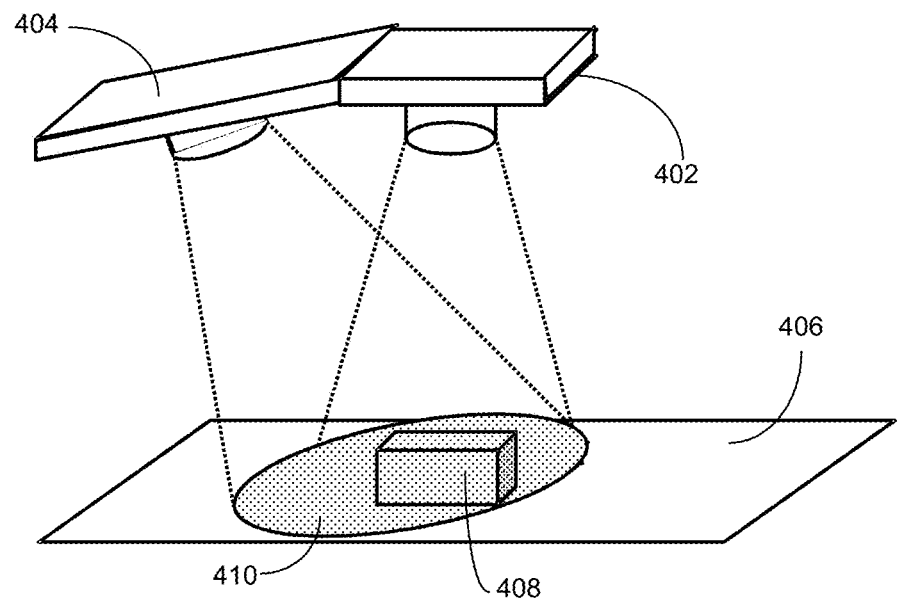
FIG. 4A illustrates the scenario where a 3D surface-imaging system performs spatial codification, according to one embodiment.

FIG. 4A illustrates the scenario where a 3D surface-imaging system performs spatial codification, according to one embodiment. In FIG. 4A, camera 402 and structured-light projector 404 can be situated above work surface 406 that includes component 408. In some embodiments, camera 402 can be a far-field-of-view camera capable of capturing far-field images. In FIG. 4A, camera 402 and structured-light projector 404 can be arranged in such a way that the angle formed by the projection direction of structured-light projector 404 and the optical axis of camera 402 is between 15° and 40°, preferably 25°. The offset between optical axes of camera 402 and structured-light projector 404 allows for triangulation-based 3D imaging.

In the example shown in FIG. 4A, structured-light projection 404 can project a dotted pattern 410 onto work surface 406 over a wide field of view, and camera 402 can capture an image of work surface 406 illuminated by dotted pattern 410. A rough 3D point cloud can be generated based on the captured image, which includes the rough 3D pose of the component. Moreover, the system can estimate a distance to component 408 based on the captured image. Once the distance is close enough, the 3D surface-image system can perform spatial and time-multiplexed 3D surface imaging.

Figure 4B:
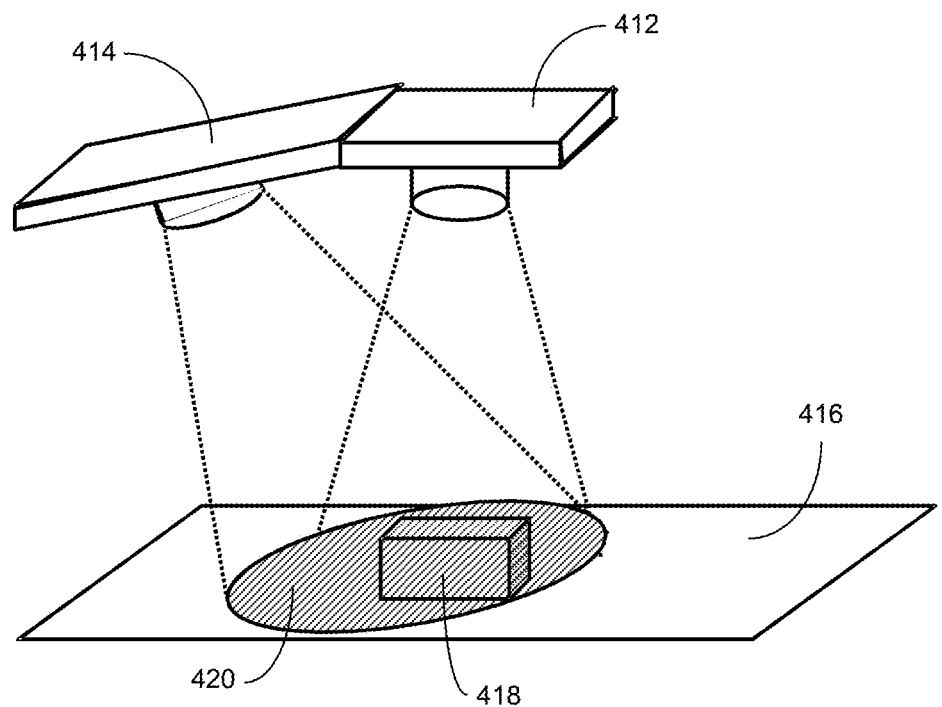
FIG. 4B illustrates the scenario where a 3D surface-imaging system performs spatial and time-multiplexed 3D imaging, according to one embodiment.

FIG. 4B illustrates the scenario where a 3D surface-imaging system performs spatial and time-multiplexed 3D imaging, according to one embodiment. In FIG. 4B, camera 412 and structured-light projector 414 have been moved closer to work surface 416 and component 418. In some embodiments, camera 412 can be a near-field-of-view camera capable of capturing near-field images. Similar to what's shown in FIG. 4A, camera 412 and structured-light projector 414 can be arranged in such a way that the angle formed by the projection direction of structured-light projector 414 and the optical axis of camera 412 is between 15° and 40°, preferably 25°. To facilitate spatial and time-multiplexed 3D imaging, structured-light projector 414 can project a sequence of predetermined patterns (e.g., striped pattern 420), and camera 412 can capture a sequence of images. The image capturing and the pattern projection are in sync with each other. A fine 3D point cloud can then be generated based on the captured images. This high resolution 3D point cloud can provide highly accurate 3D pose of component 418, thus enabling the gripper to approach and pick up component 418.

Figure 5:
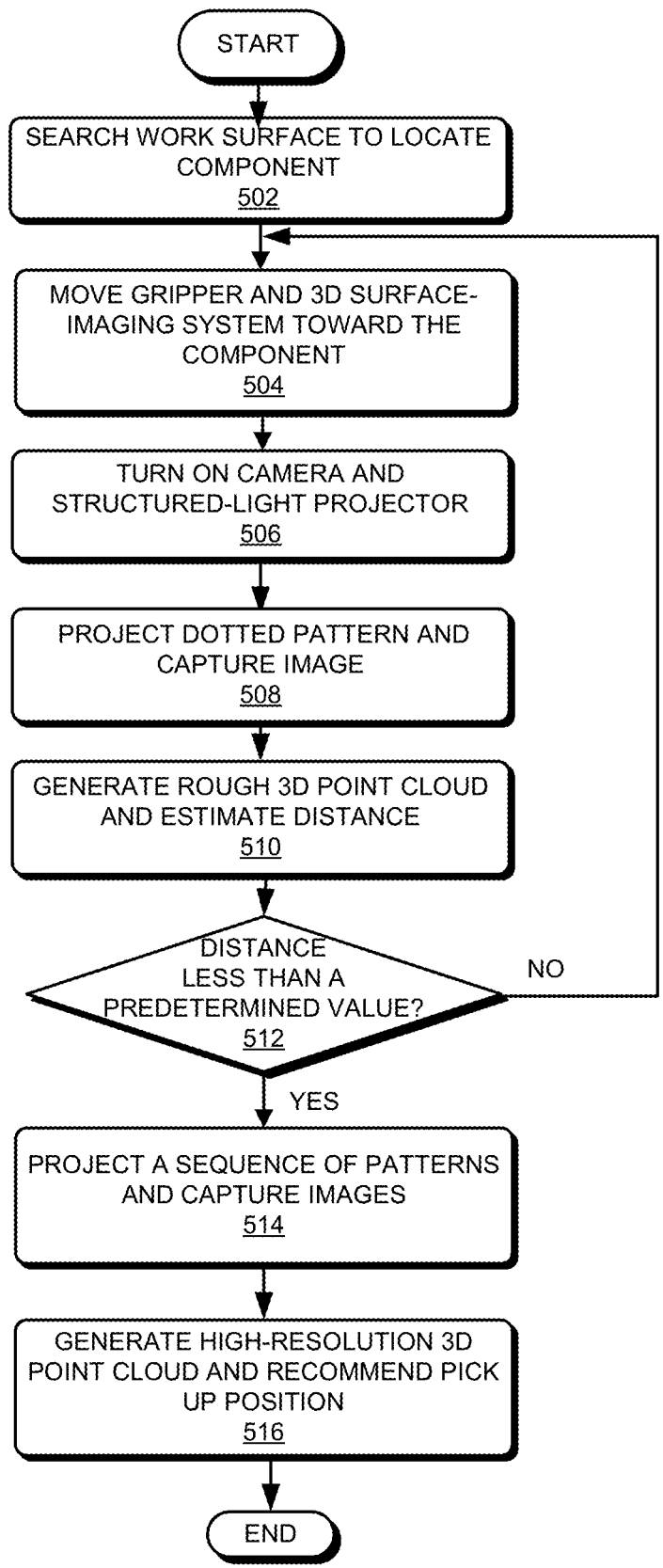
FIG. 5 shows a flowchart illustrating the operation of an exemplary robot, according to one embodiment.

FIG. 5 shows a flowchart illustrating the operation of an exemplary robot, according to one embodiment. During operation, the robot first searches the work surface to locate a particular component (operation 502). In some embodiments, such a search can involve a wide-field-of-view camera, and a pre-trained neural network can be used to identify the desired component. Subsequent to locating the desired component on the work surface, the robot can move its gripper along with a 3D surface-imaging system, which can include a close-range camera and a structured-light projector, toward the vicinity of the component (operation 504). The robot can further turn on the camera and the structured-light projector (operation 506). The structured-light projector can project a dotted pattern onto the part of the work surface that includes the desired component (i.e., the area of interest) and the camera can capture an image of the illuminated area (operation 508). The robot can then generate a rough 3D point cloud for the area of interest and estimate a distance to the component (operation 510).

The robot then determines whether the distance is less than a predetermined value (e.g., 150 mm) (operation 512). If not, the robot continues to move the gripper (operation 504). If so, the structured-light projector projects a sequence of frames of various predetermined patterns (e.g., striped patterns) onto the object and its close vicinity and the camera synchronously captures images (operation 514). More specifically, an image can be captured for each pattern. In other words, the 3D imaging system uses fast spatial and temporal patterns to encode and decode depth information. In some embodiments, the structured-light projector can project 60 frames per second. Accordingly, the camera can be configured to capture images at a rate of 60 frames per second.

Many electronics components can have a wide range of reflectivity, with some components having a specular reflection while some are highly absorbent to light. To improve the image quality, thus the quality of the 3D point cloud, in some embodiments, the camera can include a set of polarizers in order to optimize the level of specular lights rejected for best signal-to-noise ratio and contrast. In further embodiments, HDR (high dynamic range) techniques can be used to improve the dynamic range of the input data. For example, each projected pattern can have two exposures (i.e., two images are captured for each projected pattern). Based on the captured images, the robot can further generate a high-resolution 3D point cloud of the component and its close vicinity and recommend a pick up position of the gripper (operation 516).

Figure 6:
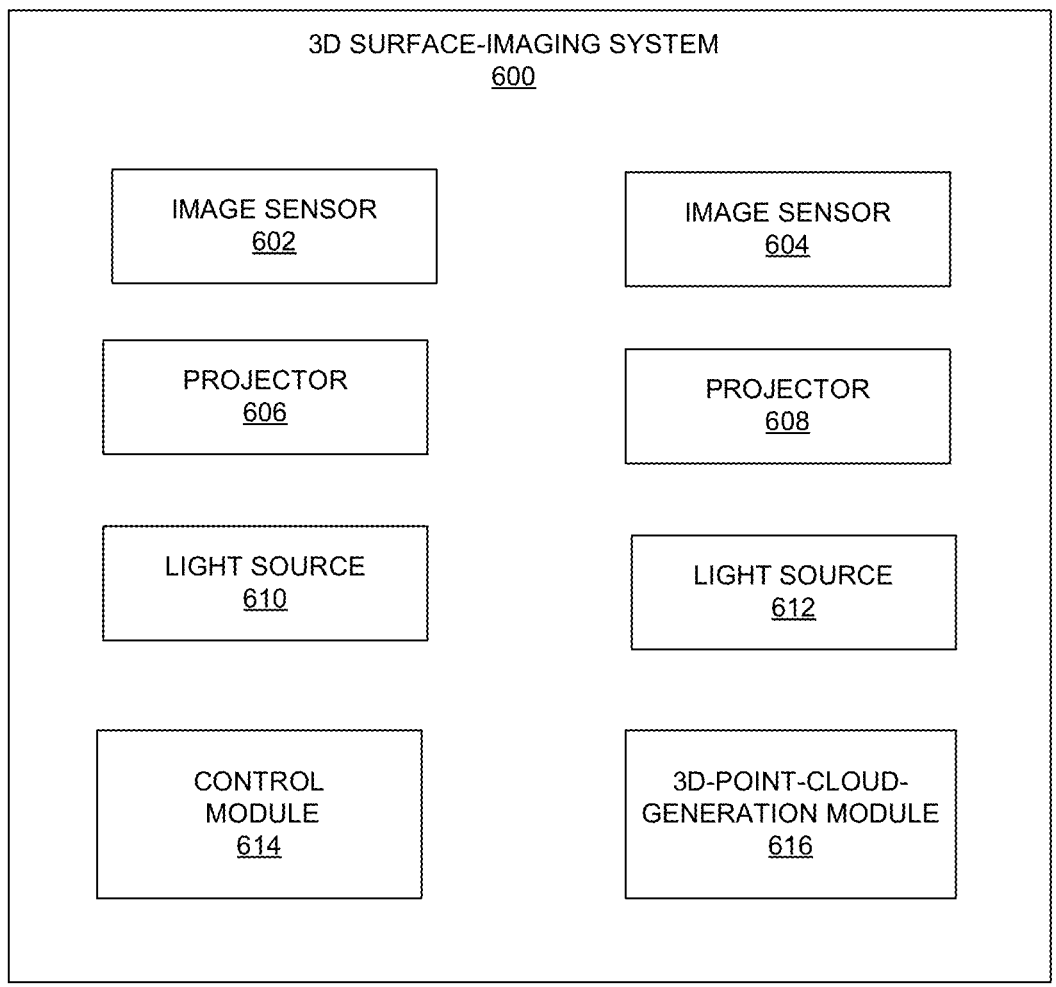
FIG. 6 shows the block diagram of an exemplary 3D surface-imaging system, according to one embodiment.

FIG. 6 shows the block diagram of an exemplary 3D surface-imaging system, according to one embodiment. 3D surface-imaging system 600 can include a number of image sensors (e.g., image sensors 602 and 604), a number of projectors (e.g., projectors 606 and 608), and a number of light sources (light sources 610 and 612) for the projectors. The projectors are used for projecting structured light. 3D surface-imaging system 600 can further include a control module 614 and a 3D-point-cloud-generation module 616.

Each image sensor can be part of a camera system. In some embodiments, the camera systems can be a far-field-of-view camera or a near-field-of-view camera. Alternatively, 3D surface-imaging system 600 can include a single camera system with a wide range of focal lengths that can capture both wide-angle images as well as close-up images. Note that the wide-angle images are used for the initial searching for and locating of a component, whereas the close-up images are used for extracting accurate 3D pose information of the component. In some embodiments, the resolutions of the image sensors can be 1280×1240, 2080× 1552, or 4000×3000, and the resolution of the projectors can be 608×648, 912×1140, or 1920×1080. Moreover, the projectors can include various image projection devices, including but not limited to: digital light processing (DLP) chips, mirror arrays, and independently addressable VCSEL (vertical-cavity surface-emitting laser) arrays; and the light source can include LEDs or lasers (e.g., a VCSEL or a VCSEL array). In some embodiments, if the light sources include a laser, the laser can operate in multiple modes of oscillation and short-pulse mode to minimize speckles. The light sources can emit visible light, infrared light, or ultra-violet light. In further embodiments, the wavelength of the emitted light can be tunable according to the surface condition of the component of interest, in order to obtain high image contrast.

Control module 614 can control both the image sensors (i.e., the cameras) and the projectors, including the light sources. For example, control module 614 can tune the emitting wavelength of the light sources based on the surface condition of the illuminated component. Control module 614 can further control the patterns to be projected by the projectors and the pattern-projecting frequency. For example, control module 614 can control a projector to project patterns at a frequency of 60 frames per second. The patterns can include dot arrays, parallel lines, grids, etc. In the meantime, control module 614 can control the image sensors (more precisely, the shutters of the cameras) such that the image sensors record images synchronously with the projected patterns. At least one image is recorded for each projected pattern.

3D-point-cloud-generation module 616 can generate a 3D point cloud based on captured images. Depending on the resolution of the captured images, 3D-point-cloud-generation module 616 can generate a low- or high-resolution 3D point cloud. For example, 3D-point-cloud-generation module 616 can generate a 3D point cloud based on a single image. The generated 3D point cloud can be low resolution and less accurate. On the other hand, 3D-point-cloud-generation module 616 can also generate a high-resolution 3D point cloud based on a sequence of time-multiplexed images. In some embodiments, to increase accuracy, the 3D point cloud generated using structured light can be fitted into a pre-defined CAD model of the component in order to achieve full scale dimensions.

Intelligent Robots: The Learning

As discussed before, another challenge facing the implementation of robots in the assembly line of consumer electronics is the short product life cycle of the consumer electronics. Typical consumer electronics products (e.g., smartphones, tablet computers, digital cameras, etc.) can have a relatively short life cycle, such as less than a year, and the manufacturers of consumer electronics are constantly upgrading their products. Each product upgrade can require the upgrade of the assembly line. This also means that the assembly line workers (humans or robots) need to learn new skills. Although training a human to recognize a new component may not be difficult, training a robot to do the same task may be a challenge. In some embodiments, machine learning techniques can be used to train the robot, especially the visioning system of the robot, to recognize various components. More specifically, a convolutional neural network (CNN) can be trained to recognize components as well as their 3D poses.

To increase the training efficiency, in some embodiments, instead of using images of real-life components, CAD-generated images can be used to train the CNN. More specifically, the CAD system can generate images of a particular component (e.g., a connector with cable) at various positions and orientations under various lighting conditions. More specifically, various light sources (e.g., point source, diffuse light, or parallel light) can be simulated in CAD. Based on the CAD models of the component and the light sources, one can generate realistic representations of how an object can appear for a vision camera in all combinations of pose, location, and background. These CAD-generated images can become training input data for robust training of the CNN. In some embodiments, the CAD-generated images are 2D images. However, perspective projection and image scale may help with estimation of the first order depth value. In alternative embodiments, the system can also train the CNN using structured-light-based 3D images. More specifically, when generating the images, the CAD system can use structured light as the light source to obtain 3D data (e.g., depth, contour, etc.) associated with a component. The 3D data can be used as additional input for the training of the CNN, complimentary to the 2D shading data generated by the CAD system.

In addition to CAD-generated images, in some embodiments, the training images can also be obtained by performing 3D scanning on real life components. More specifically, the 3D scan can use structured light as a light source.

In some embodiments, thousands, or hundreds of thousands, of images can be generated with labels that indicate their position and orientation. These labeled images can then be used to train a CNN to generate a transformation from images to positions and orientations (poses). The transform recipe obtained through machine leaning can be loaded onto a processing module (e.g., an image processor) of the robot. During operation, a camera installed on the robot can capture one or more images of a component and send the captured image to the image processor, which can then generate the pose of the component based on the transform recipe. Using CAD-generated images for training can reduce the amount of manual labor needed to acquire and label images, thus increasing training speed. Moreover, the training can be done offline, thus reducing the downtime of robots.

In some embodiments, the robot system can further implement a calibration process to further improve the detection accuracy and to correct for the variations between a CAD-generated image and an image captured by cameras. The calibration process can be performed using a reference component. More specifically, during operation, the robot can generate a transform recipe for the reference object based on CAD-generated training images of the reference object. Moreover, the robot's camera system can obtain reference images of the reference object in various known positions and poses. The robot system can then use the transform recipe and a reference image to compute the position and pose of the reference component, and compare the computed position and pose to the known position and pose. The difference can then be used as correction factors that can be used to correct the transformation result of a real component. For example, the difference can be used to modify the transform recipe.

Moreover, the reference images can be used to correct distortion of the camera system. More specifically, a specially designed reference object (e.g., a grid) can be used for calibration purposes. Images taken by the camera system of the reference object may include distortion by lenses. By comparing the grid pitches on the images and the known pitches, one can infer the amount of distortion caused by the camera system and generate corrected images accounting for the camera distortions.

In some embodiments, there are two types of CNN, one for classifying components and one for classifying poses. Note that the pose-classifying CNNs can be component-specific. More specifically, a two-step approach can be used to identify a component and its pose. In the first step, based on wide-angle images of the work surface and a CNN trained for classifying components, the vision system of the robot can identify and locate a desired component on the work surface. Once the component is identified and located, a pose-classifying CNN that is specific to the identified component can be used to recognize the pose and location in higher resolution and confidence. Note that inputs to the pose-classifying CNN can include high-resolution 2D or 3D images. This two-step approach requires less complex modeling, thus resulting in fast and efficient training.

In alternative embodiments, instead of relying on a transform recipe to recognize the pose of a component, the system can generate a template image for the component. The template image describes the position and pose of the component when it is ready to be picked up by the robot gripper using a pre-defined trajectory and stroke. During operation, after identifying and locating a component, the gripper along with a camera can be brought toward the component. During this process, the camera continues to capture images at a predetermined frequency (e.g., 24 frames per second). The image processor of the robot can calculate, for each captured image, a confidence factor by comparison of the captured image and the template image. Higher similarities can result in larger confidence factors. The variation of the calculated confidence factors can be used to calculate the movement of the robot. Once the confidence factor reaches a threshold value (i.e., once the current location and pose of the gripper and camera match their presumed location and pose), the robot can move toward the component using the pre-defined trajectory and stroke. In other words, the robot plans ahead a trajectory and stroke from a particular location to pick up a component and computes the expected location and pose of the component seen by the camera, i.e., generating the image template. The robot can then adjust the position and pose of the gripper and camera until an image captured by the camera matches the image template, indicating that the gripper has reached the planned location. In further embodiments, subsequent to acquiring the pose and location and computing motion planning, the gripper can move toward the component with the optimized attack angle. The camera can capture an image at this point. The captured image can be compared with the template image to allow for fine tuning of the gripper's approach. Maximizing the template-matching can ensure high confidence of the gripper approach.

Figure 7A:
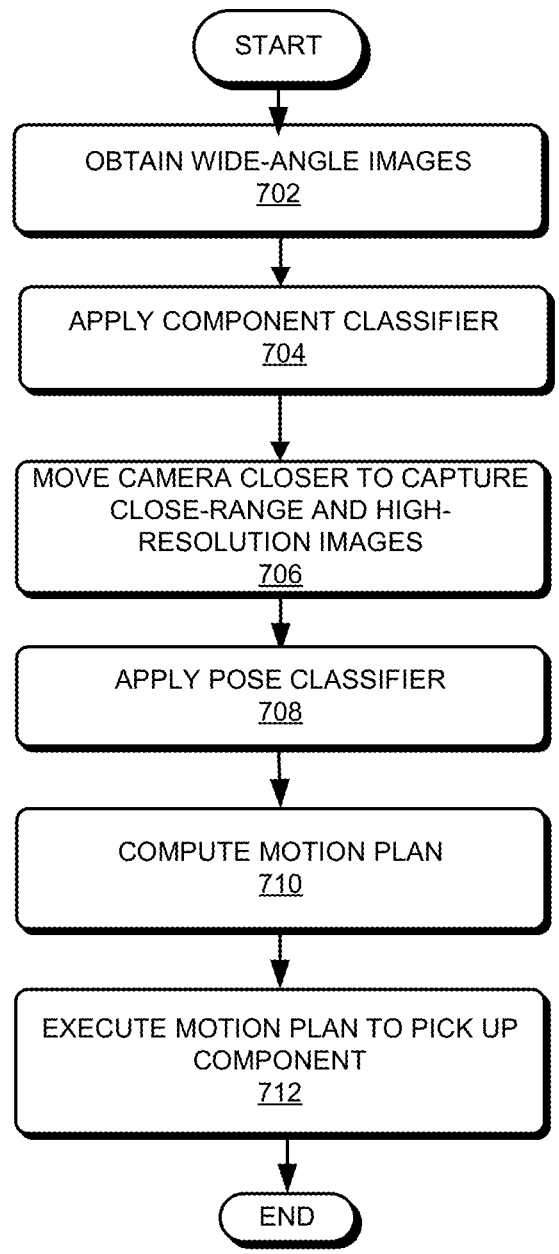
FIG. 7A shows a flowchart illustrating an exemplary operation process of a robot, according to one embodiment.

FIG. 7A shows a flowchart illustrating an exemplary operation process of a robot, according to one embodiment. During operation, the robot can obtain wide-angle images of a work surface that may include multiple components (operation 702) and uses a component classifier to locate and identify a desired component (operation 704). Note that the component classifier can include a CNN trained to recognize different components. Subsequent to locating the desired component, the robot can move its camera and gripper closer to the located component to capture close-range and high-resolution images (operation 706). The images can include 3D images obtained using structured light. In some embodiments, the 3D images can be represented using a 3D point cloud. To increase accuracy, in some embodiments, the 3D point cloud generated using structured light can be fitted into a pre-defined CAD model of the component in order to achieve full scale dimensions. The robot can then apply a pose classifier to obtain 3D pose information (operation 708). The pose classifier can include a CNN previously trained to recognize various poses of that identified component. More specifically, obtaining the 3D pose information can include identifying a transform recipe based on the captured images and applying the identified transform recipe to transform the images to poses. Based on the 3D pose information of the component and the current location and pose of its gripper, the robot can compute a motion plan (operation 710) and execute the motion plan to pick up the component (operation 712). Note that, as the robot approaches the component, additional images can be taken, and the robot can use the additional images to fine tune its movements.

Figure 7B:
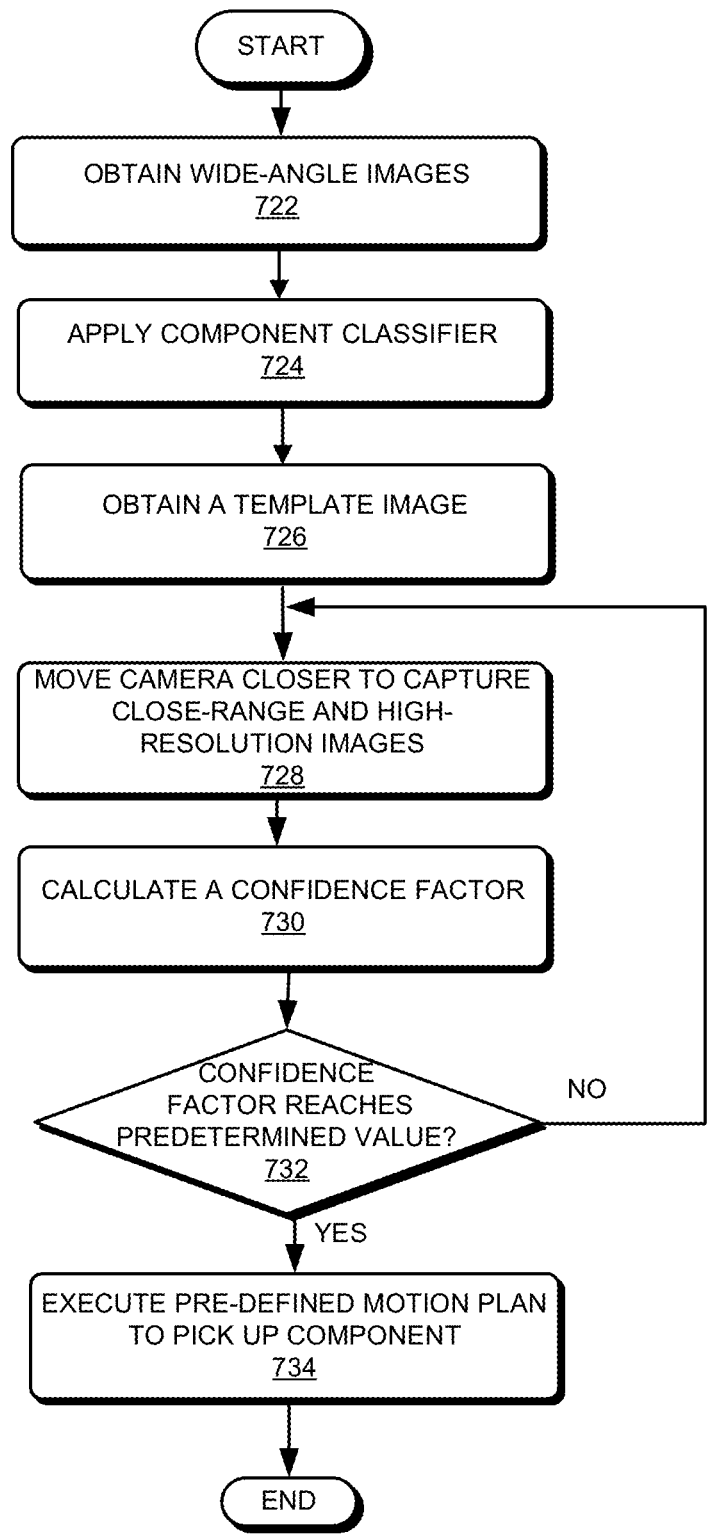
FIG. 7B shows a flowchart illustrating another exemplary operation process of a robot, according to one embodiment.

FIG. 7B shows a flowchart illustrating another exemplary operation process of a robot, according to one embodiment. During operation, the robot can obtain wide-angle images of a work surface that may include multiple components (operation 722) and uses a component classifier to locate and identify a desired component (operation 724). Subsequent to locating the desired component, the robot can obtain a template image of the desired component (operation 726). The robot can then move its camera and gripper closer to the located component to capture close-range and high-resolution images (operation 728). The robot can compare the captured image with the template image to calculate a confidence factor (operation 730) and determine whether the confidence factor reaches a predetermined threshold (operation 732). If not, the robot continues to move its camera and gripper (operation 728). If so, the robot has reached a desired location and can execute a pre-defined motion plan to pick up the component (operation 734).

Intelligent Robots: The Assembly Operation

In a typical assembly line, a simple assembly operation can involve multiple (e.g., two) components, such as engaging two or more components. For example, an assembly operation of a consumer electronics product may involve mating two electrical connectors, such as inserting a male connector into the corresponding female connector. A connector can be attached to a cable, causing the connector to be suspended in midair. As discussed previously, this presents a challenge for a robot to accurately locate the connector. On the other hand, structured-light-based surface imaging and CNN-based machine learning allows the intelligent robot to obtain accurate depth information, thus allowing the intelligent robot to perform such difficult task.

Figure 8:
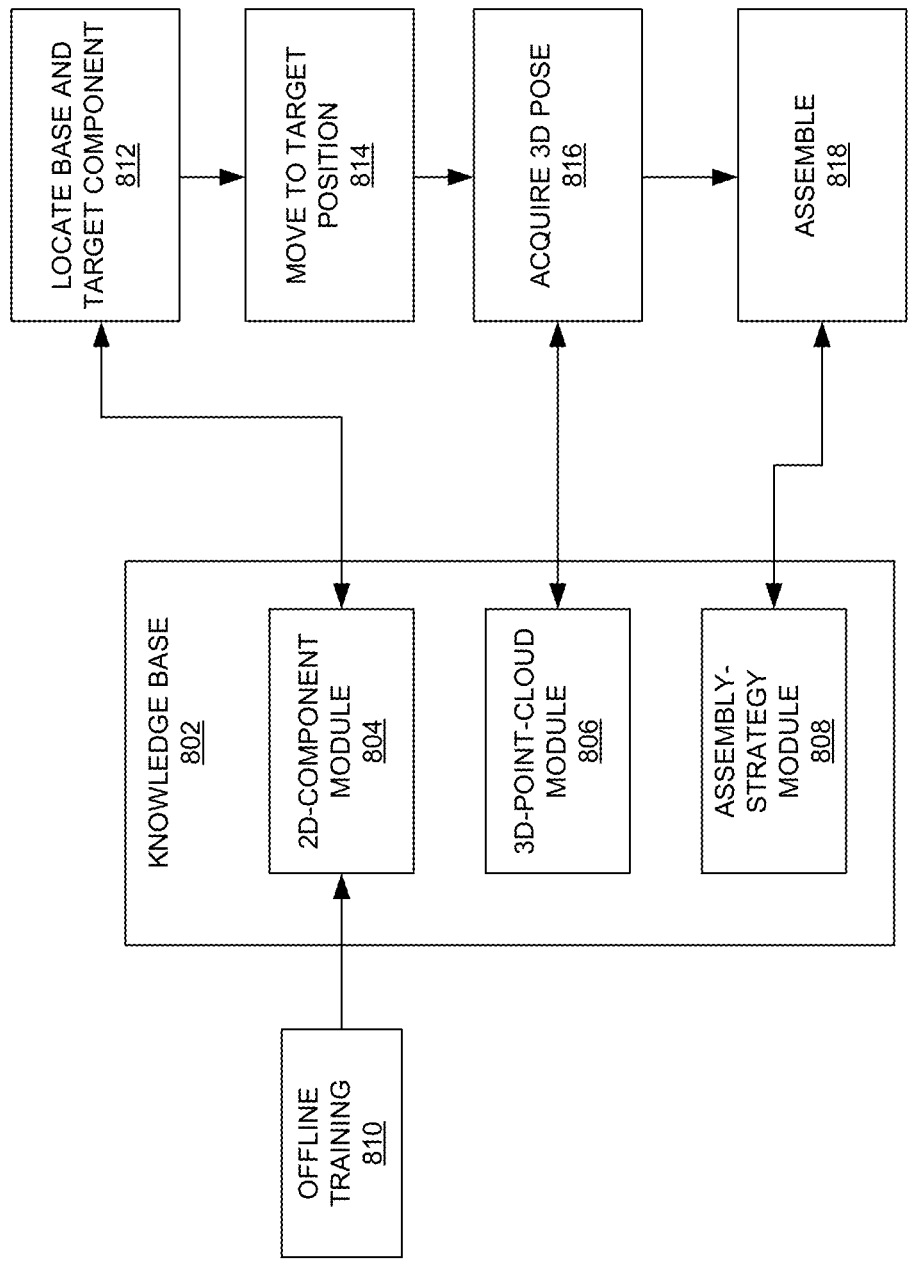
FIG. 8 presents a flow diagram illustrating the operation of an exemplary robot in an exemplary assembly line, according to one embodiment.

FIG. 8 presents a flow diagram illustrating the operation of an exemplary robot in an exemplary assembly line, according to one embodiment. More specifically, the exemplary assembly line can be for assembling a consumer electronics product, such as a smartphone.

Prior to operating on the assembly line, the robot needs to acquire a knowledge base 802, which can include various modules, such as 2D-component module 804, 3D-point-cloud module 806, and assembly-strategy module 808. More specifically, 2D-component module 804 can store 2D models of various components that are used in the assembly line. In some embodiments, 2D-component module 804 can include a CNN previously trained by an offline training process 810. In further embodiments, training the CNN can involve generating 2D images of the various components using their CAD models. 3D-point-cloud module 806 can include 3D models of the various components in the form of a point cloud. Assembly-strategy module 808 can include a number of pre-determined assembly strategies based on the locations and poses of the various components. More specifically, the assembly strategy can include calculated trajectories and angles of the gripper of the robot. In some embodiments, the robot can also have the capability of imitation learning, where a single assembly task or a sequence of assembly tasks can be modeled and learned by the robot. In a further embodiment, the robot can include an AI-enabled HMI that allows the robot to communicate with a human worker. For example, the human worker can input verbal or gesture-based commands to control movements of the robot. Moreover, a human worker can also demonstrate to the robot how to perform a certain task.

Figure 9:
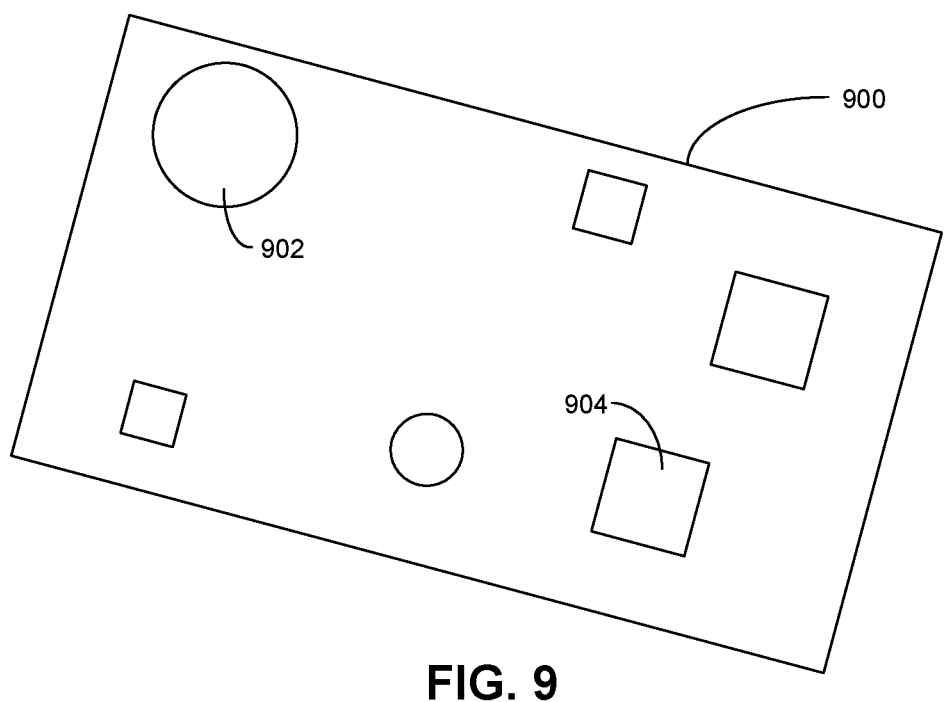
FIG. 9 shows an exemplary base plate on the assembly line.

During operation, the robot can first locate the base plate and one or more target components based on 2D images captured by its camera system and the 2D model maintained by 2D-component module 804 (operation 812). Note that the robot can further determine the orientation (e.g., angle tilt or position shift) of the base plate based on a number of identified key components or points on the base plate. FIG. 9 shows an exemplary base plate on the assembly line. In FIG. 9, base plate 900 can include a number of prominent or key components, such as components 902 and 904. Due to their sizes and/or unique features, these key components can be easily identified from a 2D image of the base plate. Using the 2D model of these components, the robot can determine the orientation of the base plate. Note that, on an assembly line, the orientation of the base plate can be arbitrary. The resolution of the image can determine the accuracy of the locations. More specifically, the 2D location (e.g., X-Y) accuracy of the components can be determined based on the size of the image pixels. In addition to determining the 2D location, in some embodiments, the robot may also infer depth information based on the relative distance between the key components.

Figure 10:
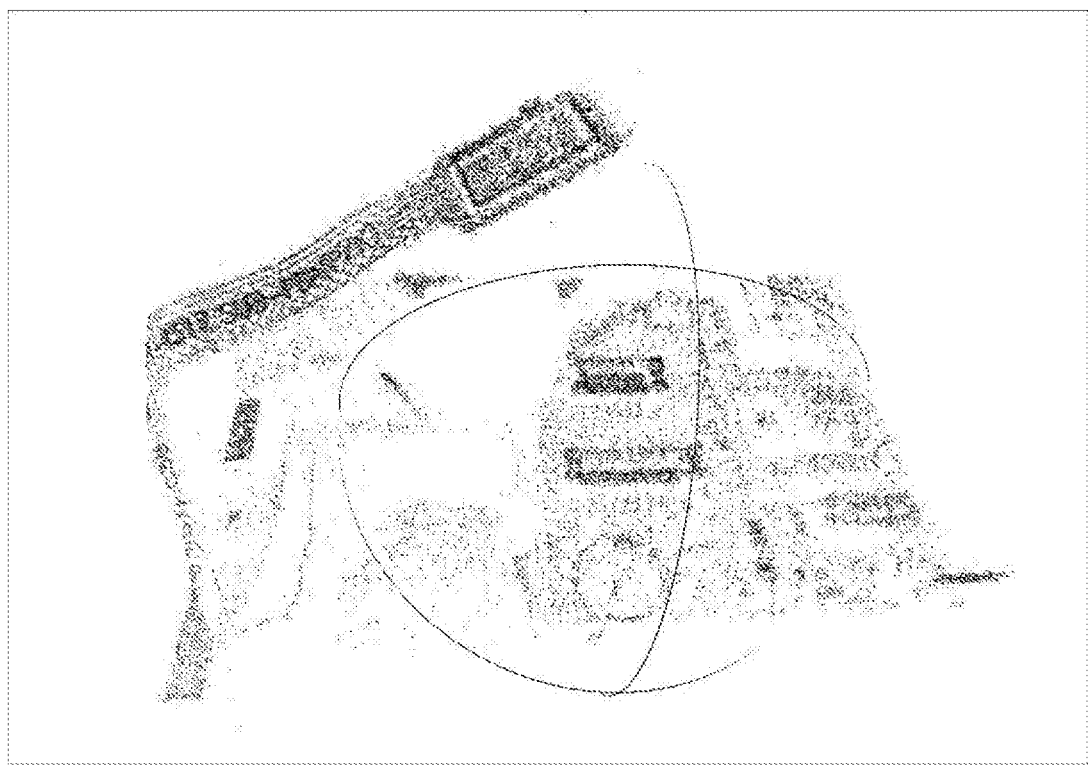
FIG. 10 shows an exemplary 3D point cloud generated by the robot, according to one embodiment.

Returning to FIG. 8, subsequent to locating the target component, the robot can move to the target position (e.g., to a position closer to or directly above the target component (operation 814). The robot can then acquire the 3D pose information associated with the target component (operation 816). Acquiring 3D pose information of the computer can involve capturing 3D surface images and generating a 3D point cloud based on the captured images. FIG. 10 shows an exemplary 3D point cloud generated by the robot, according to one embodiment. More specifically, the 3D point cloud shows a loose cable connector, marked by the dashed circle. To obtain the 3D pose of the target component (e.g., the cable connector shown in FIG. 10), the robot can apply a 3D model of the target component maintained by 3D-point-cloud module 806. More specifically, the robot can use point-cloud template-matching to determine the exact location and angle orientation of the component in the 3D space. The detected 3D pose result can also be fed back to knowledge base 802, more specifically 3D-point-cloud module 806, to refine future pose determination.

Once the 3D pose of the component is determined, the robot can obtain an assembly strategy (which can include motion plans) from assembly-strategy module 808 and perform the assembling operation (operation 818). For example, the robot can pick up the cable connector shown in FIG. 10 and move the cable connector such that it can mate with a corresponding connector. Subsequent to a successful assembling operation, the assembly result can also be fed back to knowledge base 802, more specifically assembly-strategy module 808, to refine future assembly techniques.

In addition to detecting the 3D pose of a component prior to performing the assembly task, the robot can also use real-time vision coordination to facilitate the assembly task. In some embodiments, the robot can use a reinforcement learning technique to learn how to optimally assembly mating components (e.g., cable connectors). For example, one can use expert guidance to initially teach the robot how to assemble with best known procedures, and the robot can then further refine assembly techniques by exploring variations, guided by an action-and-reward feedback loop. More specifically, real-time machine visioning can be used to guide the progress of the assembly, where real-time video or images can be used as input to the action-and-reward feedback loop.

In addition to guiding the assembly operation, in some embodiments, the real-time vision can also be used for quality control. More specifically, each captured image and generated 3D point cloud can be used to determine the acceptance of the components and the assembly result.

Figure 11:
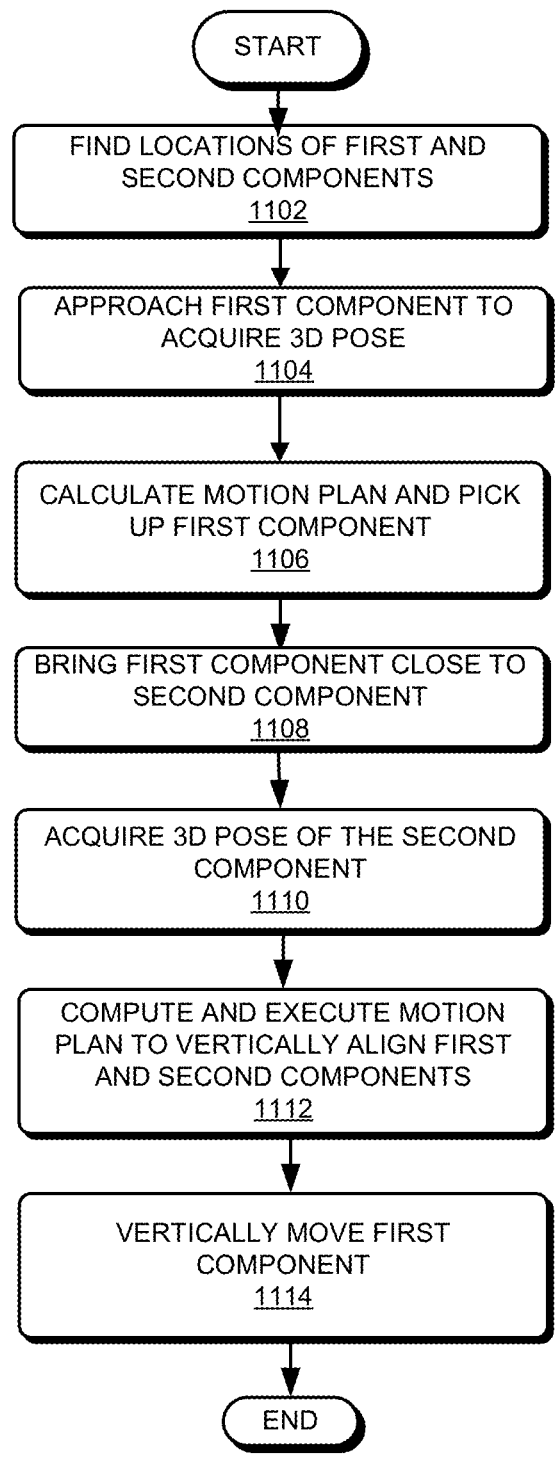
FIG. 11 shows a flowchart illustrating an exemplary assembly process by the robot for engaging two components, according to one embodiment.

FIG. 11 shows a flowchart illustrating an exemplary assembly process by the robot for engaging two components, according to one embodiment. More specifically, engaging the two components can involve inserting at least a portion of the first component into the second component. The second component can lie flat on the work surface, and the first component can either be suspended in midair or lie flat at a different location.

During operation, the robot can first find the exact locations of the first and second components (operation 1102). The robot can then approach the first component to acquire its 3D pose (operation 1104). Note that acquiring the 3D pose of the first component can involve using a structured-light-based 3D surface-imaging system to generate a 3D point cloud, similar to the one shown in FIG. 10, and applying a previously trained CNN to obtain the 3D pose information. Based on the 3D pose information, the robot can calculate a motion plan, including trajectory and angle, and picks up the first component based on the motion plan (operation 1106). Note that the first component is picked up in a way such that the pose of the component relative to the robot gripper is pre-determined. Subsequently, the robot can bring the first component to a position close to the second component (operation 1108). The robot can then acquire the 3D pose of the second component (operation 1110). Based on the 3D pose of the second component and the 3D pose of the first component relative to the gripper, the robot can compute a motion plan that can align the first component with the second component in the vertical and execute the motion plan (operation 1112). Subsequently, the robot can move the first component vertically such that the first component successfully engages with the second component (operation 1114).

In addition to engaging components, the robot can also used for bin-picking tasks. More specifically, the robot can be trained to search, identify, and track components when multiple components are stacked. The robot can also obtain a 3D point cloud of each individual component and apply a CCN previously trained using CAD-generated images to detect the 3D pose of each individual component. The robot can then pick up each individual component based on the detected 3D pose.

Exemplary Computer and Communication System

Figure 12:
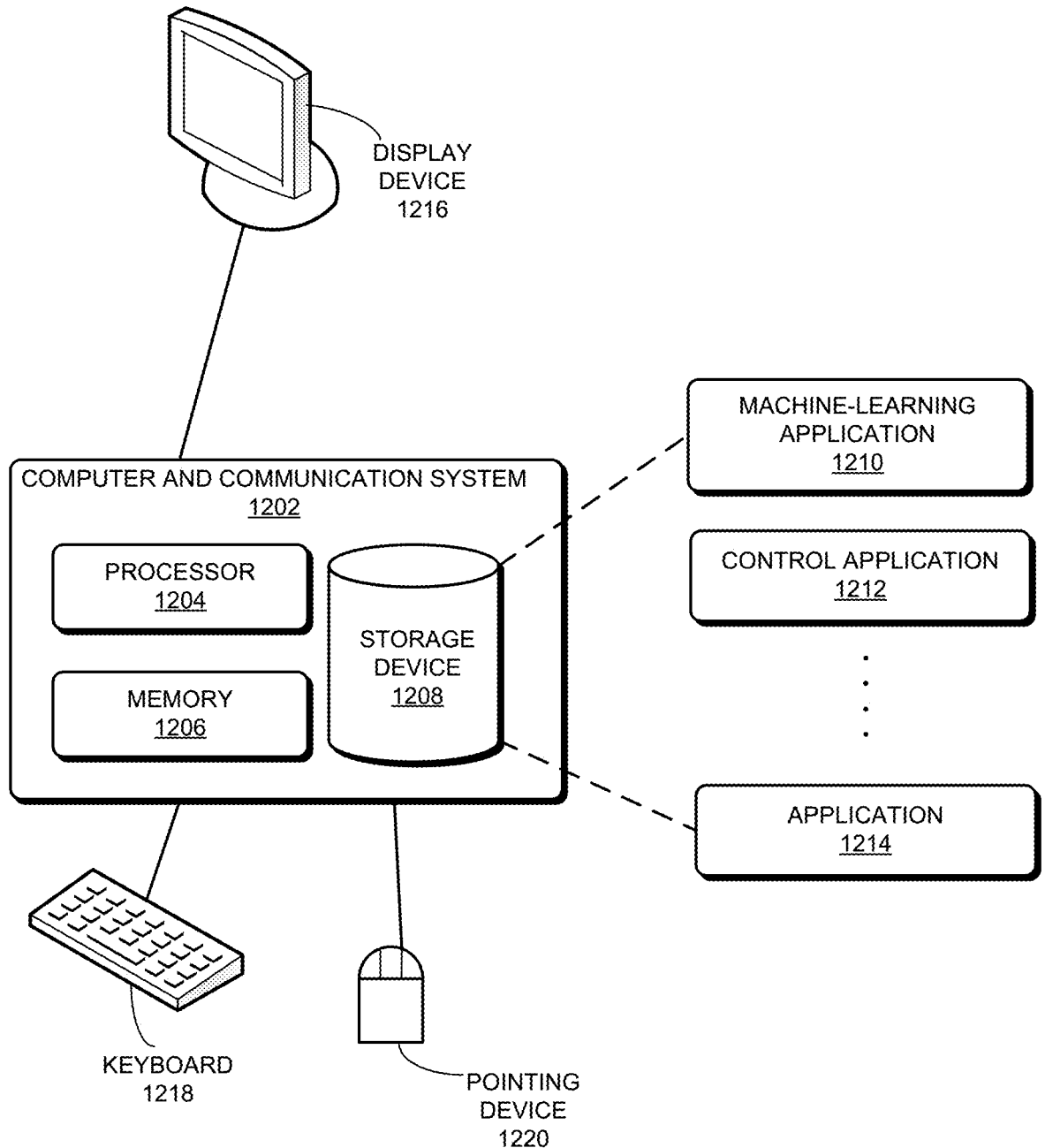
FIG. 12 illustrates an exemplary computer and communication system that facilitates training and operation of an intelligent robe, in accordance with an embodiment of the present invention.

FIG. 12 illustrates an exemplary computer and communication system that facilitates training and operation of an intelligent robot, in accordance with an embodiment of the present invention. A computer and communication system 1202 includes a processor 1204, a memory 1206, and a storage device 1208. Storage device 1208 stores various applications that can be used to facilitate the training and operation of the intelligent robot, such as a machine-learning application 1210, a control application 1212, as well as other applications, such as application 1214. During operation, machine-learning application 1210 and control application 1212 can be loaded from storage device 1208 into memory 1206 and then executed by processor 1204. While executing the program, processor 1204 performs the aforementioned functions. Computer and communication system 1202 is coupled to an optional display 1216, keyboard 1218, and pointing device 1220.

In general, embodiments of the present invention can provide an intelligent robotic system that can be used for light-load, precise, and complex assembly operations required for manufacturing consumer electronics. The intelligent robotic system combines structured-light-based 3D surface-imaging technology and CNN-based machine-learning technology to achieve accurate 3D pose detection components. Moreover, by training the CNN using CAD-generated images, the robotic system can experience minimum downtime when upgrading the assembly task. The intelligent robotic system also includes a multi-axis arm having six degrees of freedom.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An intelligent robotic system, comprising:
    at least one multi-axis robotic arm;
    at least one gripper attached to the multi-axis robotic arm for picking up a component;
    a machine vision system comprising at least a three-dimensional (3D) surface-imaging module, wherein the 3D surface-imaging module comprises a structured-light projector, and wherein the structured-light projector is configured to:
        in response to determining that a distance between the 3D surface-imaging module and the component is greater than a predetermined value, project a spatially coded pattern on the component, thereby allowing the 3D surface-imaging module to generate 3D imaging information associated with the component at a first resolution, and
        in response to determining that the distance is less than the predetermined value, project a spatially coded and time-multiplexed pattern on the component, thereby allowing the 3D surface-imaging module to generate 3D imaging information associated with the component at a second resolution that is higher than the first resolution, wherein the 3D imaging information at the first resolution is used for determining a location of the component, and wherein the 3D imaging information at the second resolution is used for determining
    a 3D pose of the component; and
    a control module configured to control movements of the multi-axis robotic arm and the gripper based on the determined location and 3D pose of the component.

2. The intelligent robotic system of claim claim 1, wherein the structured-light projector comprises:
    a digital light processing (DLP) chip;
    a mirror array; or
    an independently addressable VCSEL (vertical-cavity surface-emitting laser) array.

3. The intelligent robotic system of claim 1, wherein the machine vision system is configured to apply a machine-learning technique while determining the location and the 3D pose of the component.

4. The intelligent robotic system of claim 3, wherein applying the machine-learning technique comprises training one or more convolutional neural networks (CNNs).

5. The intelligent robotic system of claim 4, wherein training the CNNs comprises using a plurality of images of the component generated based on a computer-aided design (CAD) model of the component as training samples.

6. The intelligent robotic system of claim 4, wherein the CNNs comprise a component-classifying CNN and a pose-classifying CNN.

7. The intelligent robotic system of claim 1, wherein the machine vision system further comprises an ultrasonic range finder configured to estimate a distance between the gripper and the component.

8. The intelligent robotic system of claim 1, wherein the multi-axis robotic arm has at least six degrees of freedom.

9. The intelligent robotic system of claim 1, further comprising at least one two-dimensional (2D) imaging module configured to obtain wide-field visual information associated with the component.

10. A method for operating an intelligent robotic system that comprises at least one multi-axis robotic arm and at least one gripper attached to the multi-axis robotic arm for picking up a component, the method comprising:

determining a location and a 3D pose of the component using a machine vision system, wherein the machine vision system comprises at least a three-dimensional (3D) surface-imaging module, wherein the 3D surface-imaging module comprises a structured-light projector, and wherein determining the location and the 3D pose comprises:

projecting, by the structured-light projector, a spatially coded pattern on the component, thereby allowing the 3D surface-imaging module to generate 3D imaging information associated with the component at a first resolution, in response to determining that a distance between the 3D surface-imaging module and the component is greater than a predetermined value, and projecting, by the structured-light projector, a spatially coded and time-multiplexed pattern on the component, thereby allowing the 3D surface-imaging module to generate 3D imaging information associated with the component at a second resolution that is higher than the first resolution, in response to determining that the distance is less than the predetermined value, wherein the 3D imaging information at the first resolution is used for determining the location of the component, and wherein the 3D imaging information at the second resolution is used for determining the 3D pose of the component; and controlling movements of the multi-axis robotic arm and the gripper based on the determined location and 3D pose of the component.

11. The method of claim 10, wherein the structured-light projector comprises:

a digital light processing (DLP) chip;
a mirror array; or
an independently addressable VCSEL (vertical-cavity surface-emitting laser) array.

12. The method of claim 10, wherein while determining the location and the 3D pose of the component, the machine vision system is configured to apply a machine-learning technique.

13. The method of claim 12, wherein applying the machine-learning technique comprises training one or more convolutional neural networks (CNNs).

14. The method of claim 13, wherein training the CNNs comprises using a plurality of images of the component generated based on a computer-aided design (CAD) model of the component as training samples.

15. The method of claim 13, wherein the CNNs comprise a component-classifying CNN and a pose-classifying CNN.

16. The method of claim 10, wherein while determining the location and the 3D pose of the component, the machine vision system is further configured to use an ultrasonic range finder to estimate a distance between the gripper and the component.

17. The method of claim 10, wherein the multi-axis robotic arm has at least six degrees of freedom.

* * * * *